Figure 1:
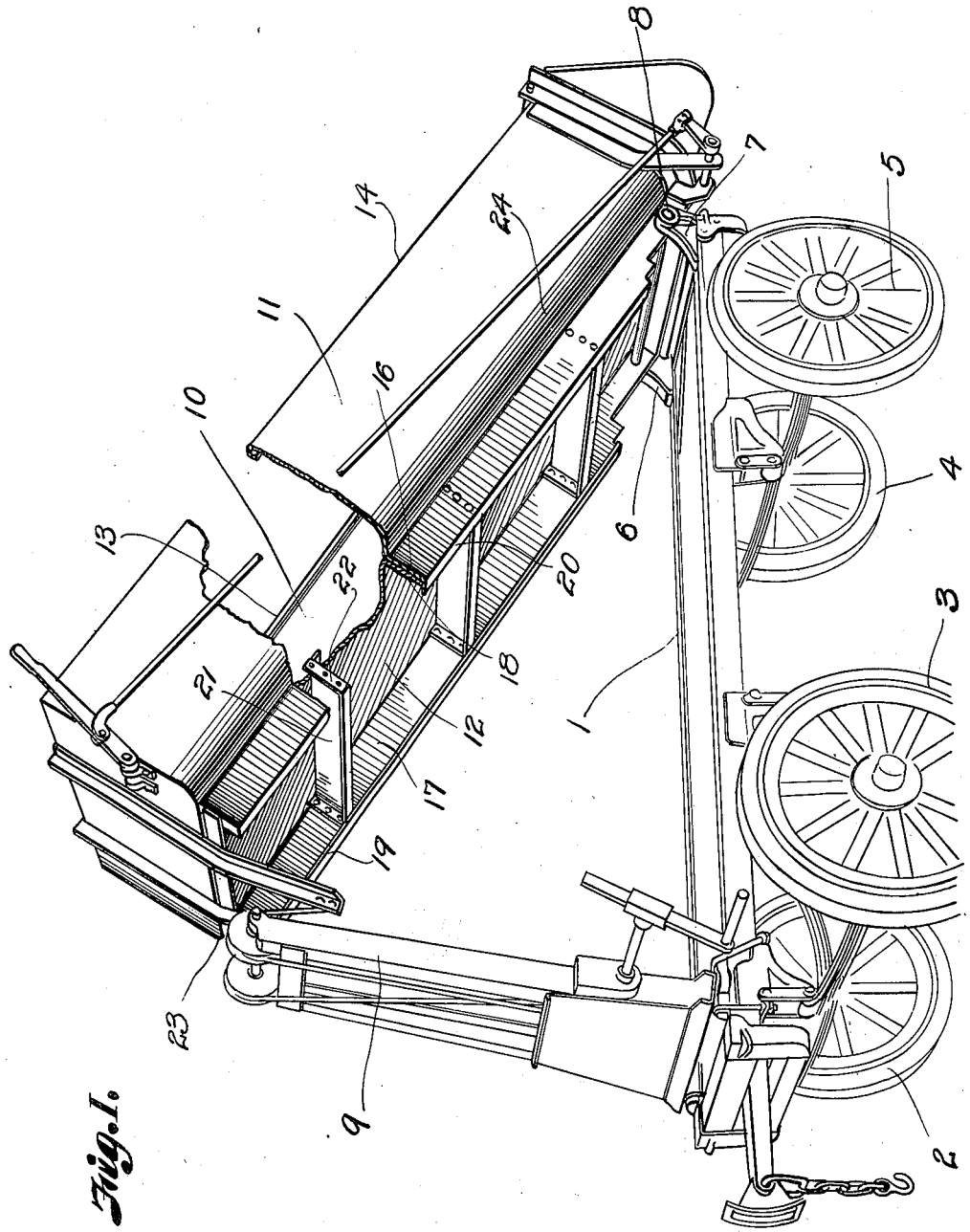

Oct. 2, 1923.

A. A. KRAMER

VEHICLE BODY

Filed May 3, 1920

1,469,320

2 Sheets-Sheet 1

INVENTOR
Andrew A. Kramer.
BY
ATTORNEY

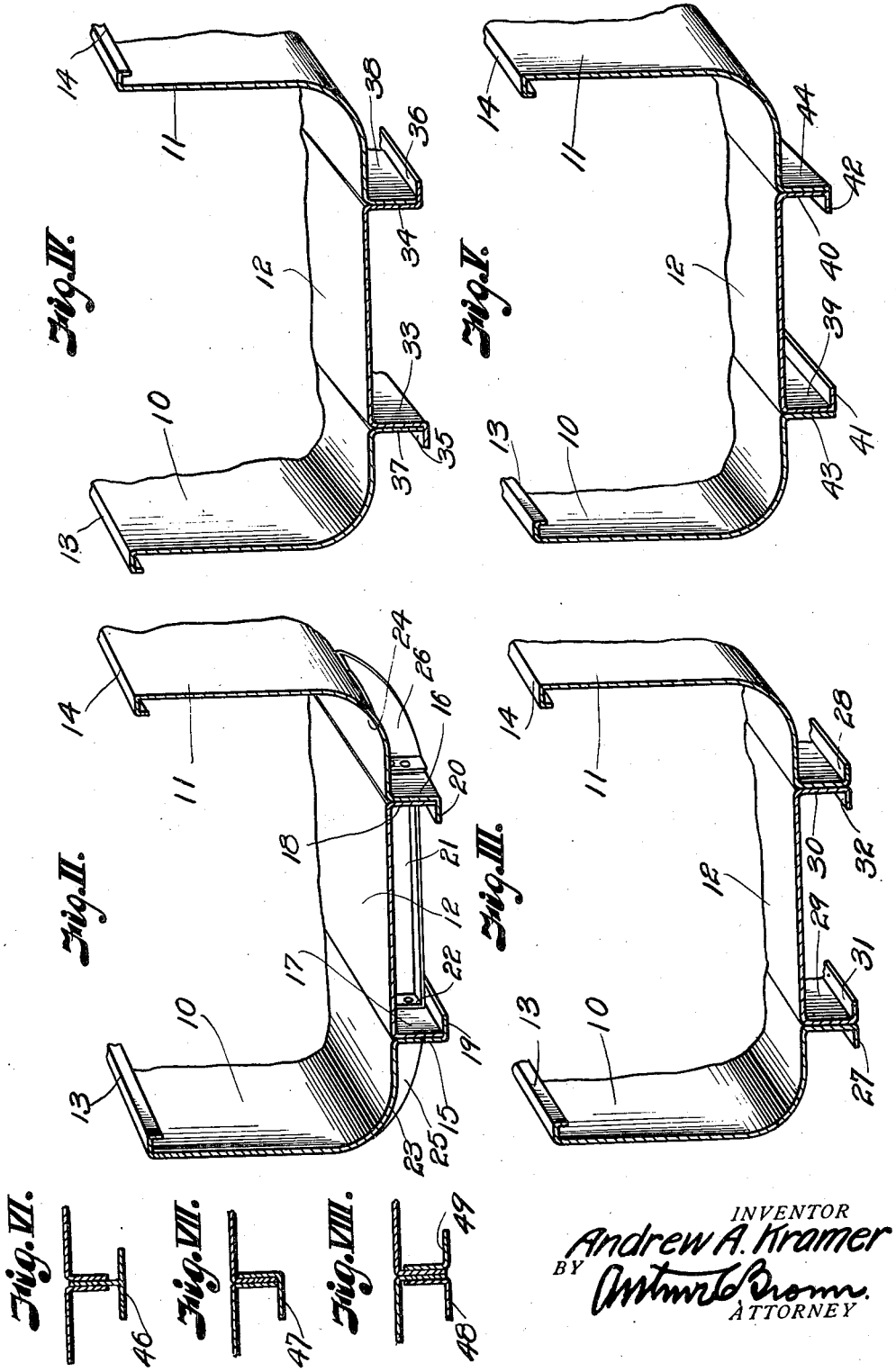

Patented Oct. 2, 1923.

1,469,320

UNITED STATES PATENT OFFICE.

ANDREW A. KRAMER, OF KANSAS CITY, MISSOURI.

VEHICLE BODY.

Application filed May 3, 1920. Serial No. 378,366.

*To all whom it may concern:*

Be it known that I, ANDREW A. KRAMER, a citizen of the United States, residing at Kansas City, in the county of Jackson and State of Missouri, have invented certain new and useful Improvements in Vehicle Bodies; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to vehicle bodies and particularly to a vehicle dump bed in which side sheets and a bottom sheet are constructed in girder form so that when the side sheets and bottom sheet are connected together, they will form a vehicle body with integral beams to support the load carried by the side sheets and bottom sheet.

The invention is particularly adapted to dump vehicles for the reason that usually the entire vehicle body is raised in order to dump the contents thereof. During the raising, the load is unsupported except by the body and such reinforcing beams as are connected to the body proper.

I have provided a simple, efficient form of body which may be constructed of sheets having edges bent into beam form and connected together so that the beams and body will be substantially integral and thereby not only decrease the cost of manufacturing the body but efficiently resist the strains to which the body will be subjected when in service.

In the drawings,

Fig. I is a perspective view of a dump vehicle of approved construction to which my invention is applied.

Fig. II is a fragmentary cross sectional view through the vehicle body.

Fig. III is a similar view of a slightly modified form of body.

Fig. IV is a like view of a further modified form.

Fig. V is a similar view of a further modification.

Fig. VI is a view showing the bottom flanges of the side sheets and an inverted T-member connecting them.

Fig. VII is a similar view showing the depending flanges of the side members connected to an angle, and Fig. VIII is a like view showing the depending flanges fastened between two angles.

Referring now to the drawings by numerals of reference:

1 designates a vehicle frame supported by wheels 2, 3, 4 and 5. The rear end of the frame is provided with upstanding ears or projections 6 and 7 to which the vehicle body may be pivoted by a rod or trunnion 8, the vehicle body being adapted to be raised by a hoist 9, for example, similar to that disclosed in the patent to Winfield L. Livengood, No. 1,312,489 of August 5, 1919.

The body proper is shown as consisting of side sheets 10 and 11 having curved side portions reinforced at the top edges by flanges and connected by a body sheet 12. By reference to Fig. II it will be observed that the flanges 13 and 14 are in-bent with depending edges constituting tension members to reinforce the upper edges of the side sheets 10 and 11. The lower portions of the side sheets 10 and 11 are curved inwardly and downwardly. The downward portions 15 and 16 co-operate with the depending flanges 17 and 18 of the floor sheet 12 to form longitudinal beams preferably extending throughout the length of the body. In Fig. II the depending portions 15 and 16 have in-bent flanges 19 and 20 to further add rigidity to the structure and they are so disposed that the depending flanges 17 and 18 of the bottom or floor sheet 12 rest against them.

The side sheets 10 and 11 and the floor sheet 12 are secured together by any suitable means as, for example, by welding or riveting, but I prefer to weld the parts together so that the entire body will be a substantially integral structure. The floor sheet 12 may be further reinforced by transverse beams shown as Z-beams 21, upon which the floor sheet 12 rests, the bottom flanges of the Z-beam 21 resting upon the upper face of the in-bent flanges 19 and 20. These Z-beams or bars are provided with end flanges 22, by means of which the beams or bars 21 may be fastened to the webs or flanges 17 and 18 of the floor sheet 12.

The curved portions 23 and 24 of the side sheets may extend laterally away from the flanges 15 and 16 and if necessary, these may be reinforced by bracket bars 25 and 26 fastened to the webs or flanges 15 and 16, although under ordinary conditions, the brackets or bars 25 and 26 may be omitted.

It will be apparent that a body constructed in accordance with the illustration in Fig. II will provide a rigid structure well adapted to resist the loads and strains to which a body will be ordinarily subjected in service.

In Fig. III I have shown a construction similar to that illustrated in Fig. II, the essential difference being that the flanges for the side sheets 10 and 11 are bent outwardly as indicated at 27 and 28 instead of being bent inwardly, as shown in Fig. II. The flanges 29 and 30 of the floor sheet 12 corresponding to the flanges 17 and 18 in Fig. II have inwardly bent edges 31 and 32 whereby an I-beam structure is formed instead of a channel as shown in Fig. II.

In Fig. IV the construction is similar to Fig. II with the exception that the flanges 33 and 34 for the floor sheet 12 have outwardly projecting edges 35 and 36 while the webs or flanges 37 and 38 rest upon the flanges 35 and 36. This construction is essentially like that shown in Fig. II with the exception that the channels are bent outward.

In Fig. V the flanges 39 and 40 for the floor sheet 12 have inturned edges 41 and 42, while the flanges 43 and 44 for the side sheets 10 and 11 are parallel with the flanges 39 and 40 and terminate at the ends thereof, the depending flanges for the side sheets and floor sheet in each instance being adapted to be secured in any well known manner but preferably welded, as above explained.

In Fig. VI the depending flanges of the side members are shown as fastened to an inverted T-member 46. In Fig. VII the flanges are fastened to a single angle iron 47, and in Fig. VIII the angle irons 48 and 49 are on opposite sides of the depending flanges.

In all of the constructions shown, the parts may be connected by autogenous soldering or welding, or they may be bolted together if desired. The former method, however, is preferred as it makes a stronger structure than where bolts are used because the bolt holes have a tendency to weaken the sheets.

What I claim and desire to secure by Letters-Patent is:

1. A wagon body comprising side members, each consisting of a single piece of sheet metal having a lower, longitudinal portion turned inwardly to form a part of the floor of the body, and a floor member, consisting of a single piece of sheet metal having its longitudinal edges secured to the edges of the floor portions of the side member and cooperating therewith to form the wagon body, the meeting edges of the floor member and of the floor portions of the side members being turned downwardly, forming flanges and said flanges being secured together to form longitudinal under-beams, flanges at opposite edges of the floor member being turned inwardly to form horizontal shelf flanges, and a brace supported on the shelf flanges and secured to the beam flanges.

2. A wagon body comprising side members, each consisting of a single piece of sheet metal having a lower, longitudinal portion turned inwardly to form a part of the floor of the body, and a floor member, consisting of a single piece of sheet metal having its longitudinal edges secured to the edges of the floor portions of the side member and cooperating therewith to form the wagon body, the meeting edges of the floor member and of the floor portions of the side members being turned downwardly, forming flanges and said flanges being secured together to form longitudinal under-beams, flanges at opposite edges of the floor member being turned inwardly to form horizontal shelf flanges, a brace supported on the shelf flanges and secured to the beam flanges, and braces secured to the under beams and to the bodies of the side members.

In testimony whereof I affix my signature.

ANDREW A. KRAMER.